US007995936B2

(12) United States Patent
Hamby et al.

(10) Patent No.: US 7,995,936 B2
(45) Date of Patent: Aug. 9, 2011

(54) OPTICAL MEASUREMENT SYSTEM AND METHOD FOR DETERMINING WEAR LEVEL OF PRINTER COMPONENTS

(75) Inventors: Eric Scott Hamby, Fairport, NY (US); Frank John Bonsignore, Rochester, NY (US); Phillip Stephen Crispino, Webster, NY (US); R. Enrique Viturro, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 529 days.

(21) Appl. No.: 12/197,054

(22) Filed: Aug. 22, 2008

(65) Prior Publication Data

US 2010/0046968 A1 Feb. 25, 2010

(51) Int. Cl.
*G03G 15/20* (2006.01)
*G03G 15/02* (2006.01)
*G01N 21/25* (2006.01)

(52) U.S. Cl. ............................ 399/33; 399/31; 356/417

(58) Field of Classification Search .................... 399/33, 399/31, 9, 411; 356/417
See application file for complete search history.

(56) References Cited

U.S. PATENT DOCUMENTS

| | | | | |
|---|---|---|---|---|
| 7,120,369 | B2 | 10/2006 | Hamby et al. | 399/49 |
| 7,123,850 | B1 | 10/2006 | Hamby et al. | 399/46 |
| 7,184,515 | B2 * | 2/2007 | Wilson | 378/47 |
| 7,228,080 | B2 | 6/2007 | Hamby et al. | 399/30 |
| 7,236,711 | B2 | 6/2007 | Burry et al. | 399/49 |
| 7,313,337 | B2 | 12/2007 | Burry et al. | 399/49 |
| 7,715,008 | B2 * | 5/2010 | Hamby et al. | 356/417 |
| 2005/0265739 | A1 | 12/2005 | Hamby et al. | 399/49 |
| 2005/0265740 | A1 | 12/2005 | Hamby et al. | 399/49 |
| 2006/0222387 | A1 | 10/2006 | Burry et al. | 399/49 |
| 2007/0003324 | A1 | 1/2007 | Gross et al. | 399/257 |
| 2007/0086799 | A1 | 4/2007 | Burry et al. | 399/49 |

* cited by examiner

*Primary Examiner* — David M Gray
*Assistant Examiner* — Rodney Bonnette
(74) *Attorney, Agent, or Firm* — Luis M. Ortiz; Kermit D. Lopez; Ortiz & Lopez, PLLC

(57) ABSTRACT

Optical measurement system and method for determining a wear level of printer components such as fuser rolls. Papers can be treated with optical brighteners, which act as distinct tag/trace molecules with fluorescent properties. A fluorescence pattern on the fuser roll can be changed in accordance with the edge density distribution in the print engine, when paper edges are accumulated on the fuser roll surface. A photo detector can capture a two-dimensional, digital image of the fluorescence pattern on the fuser roll surface to be measured, after illuminating the fuser roll, with intensity near ultraviolet range, by a light source. An image processor with a parameterized model can measure changes in the fluorescence pattern by analyzing the digital image of the fuser roll surface in order to determine the level of edge wear on the fuser rolls.

22 Claims, 7 Drawing Sheets

500

600

OPTICAL MEASUREMENT SYSTEM AND METHOD FOR DETERMINING WEAR LEVEL OF PRINTER COMPONENTS

TECHNICAL FIELD

Embodiments are generally related to digital printing systems. Embodiments are more particularly related to an optical measurement system and method for determining a wear level of printer components. Embodiments are additionally related to systems for performing preventative maintenance over the component wear.

BACKGROUND OF THE INVENTION

In many printing and/or xerography systems, images can be formed by fusing a dry marking material such as toner to a paper sheet and/or other medium using electrophotographic printing. Fusing occurs when the paper is subjected to pressure and heat to permanently affix the toner to the paper. Most common printers can utilize fuser rolls and pressure rolls that form a nip for the paper to pass through for producing the print images. The printing and/or xerography systems are normally provided with replaceable parts and/or components, which is a common failure mode. In such printers, a variety of different size sheets can be passed through the nip of the rolls, so that the fuser rolls are subjected to wear. In particular, edge wear is a leading fusing failure mode regardless of print engine type, i.e. mono or color, or market segments.

Wear is a process of gradual removal of a material from surfaces of solids subject to contact and sliding. All conformable fuser rolls suffer from surface wear, especially when the edges of the sheets contact the fuser roll surface. Such surface wear can exhibit a variety of wear patterns including abrasion, fatigue, corrugation, erosion, etc. For example, the edges of 11" and 14" sheets of paper are distributed along the surface of the fuser rolls in an axial direction in the printers without a Registration Distribution System (RDS). In such case, the paper edges can produce a stress concentration and a sheet-roll velocity differential, which degrade the thin surface coating on the fuser rolls and the elastomeric layer under the fuser roll surface. The mixed paper sizes can also produce a differential gloss streak, i.e. edge gloss, from the outboard edge. The degradation of the fuser rolls can exhibit a narrow area of lower gloss from a lead edge to a trail edge across the print fused to the paper. Such component wear is visible to the customer after a few thousand prints passed through the fuser, which degrade the service life of the fuser rolls.

In some prior art printing systems, an intelligent fusing station can be utilized for detecting incoming paper size in order to reposition the fuser roll in an axial direction based on usage demographics, such that the location of edge wear is spread over a larger area. The intelligent fusing station can be moved by a stepping-type drive motor controlled by a control and logic circuit. This way, a discrete location within the 3 inches of roll from the 11 inch position to the 14 inch position can be made available for edge redistribution, when the paper run is 11 inches wide. However, such systems can increase the printer cost and also slow down the printing productivity due to the necessity to move the paper to the fusing station during a printing operation. For example, the fuser rolls can suffer unnecessary wear at the point where the edges of the paper sheets contact the roll surface due to the movement of the fusing station. In addition, banding can also result from the utilization of such intelligent systems, which severely limit printing performance.

Referring to FIG. 1, labeled as "prior art", a schematic diagram of a graph 100 of sheet edge density distribution over a fuser roll surface is illustrated. All conformable fuser rolls (not shown) can suffer from surface wear, especially when the edges of the paper sheets contact the surface of the fuser rolls. The edge wear occurs when the paper edges pass through a fuser nip under pressure, which degrades the thin surface coating on the fuser roll and the elastomer layer under the fuser roll surface due to a stress concentration and a sheet-roll velocity differential. Such degradation can accumulate and eventually manifest itself on larger media prints as a gloss streak, also known as edge gloss.

The perceptibility of edge wear induced gloss streaks depends on the distribution of paper edges on the fuser roll surface. The gloss differential is perceptible when the edge density passes a certain threshold or peak 101. In addition, a slope 102 of the edge density distribution, i.e. a transition between worn and non-worn areas 103 of the fuser roll, also drives perceptibility as shown in FIG. 1. Sharp transitions, i.e. steep slope, from the worn and non-worn areas 103 can be perceived more readily than smooth transitions. Thereafter, the system can spread out the edge density distribution by dithering the position of the paper edge relative to the fuser roll surface in order to increase the edge wear life of a fuser roll. Such systems move the fuser roll back and forth in an axial direction, i.e. inboard to outboard, to redistribute the edge density distribution. However, such system can also suffer from real time measurements.

The majority of prior art printing systems exhibit an open problem in detection of the level of component wear in situ and in real time. One of the printing systems can measure the gloss on the fuser roll surface by scanning a point optical sensor back and forth over the fuser rolls. But, such printing systems can degrade the printing resolution. Some systems utilize fluorescent tags of toner particles for concentration measurement and detection of unauthorized components in photocopying machines, and also invisibly mark fuser belts with fluorescent ink to allow detection. Such fluorescent toners can be proposed in a variety of applications such as security and anti-counterfeiting applications, automatic density controller, toner concentration control, detection of image misregistration in tandem engines, and presence of transparency sheets in paper path. But, no prior art print engines are taught that track and analyze the fuser roll/belt edge wear in real time with higher resolution.

A need therefore exists for an improved optical measurement system and method for determining a wear level of printer components, which provides real time measurements and are also implemented in situ. Such an improved system and method are described in greater detail herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved optical measurement system and method for determining wear level of printer components.

It is another aspect of the present invention to provide for a print engine implemented with the optical measurement system.

The aforementioned aspects and other objectives and advantages can now be achieved as described herein. An improved optical measurement system and method determine the wear level of printer components such as fuser rolls. Papers can be treated with optical brighteners, which act as distinct tag/trace molecules with fluorescent properties. A fluorescence pattern on the fuser roll can be changed in accordance with the edge density distribution in the print engine, when paper edges are accumulated on the fuser roll surface. A photo detector can capture a two-dimensional digital image of the fluorescence pattern on the fuser roll surface to be measured after illuminating the fuser roll with intensity near ultraviolet range by a light source. An image processor with a parameterized model can measure changes in the fluorescence pattern by analyzing the digital image of the fuser roll surface in order to determine the level of edge wear on the fuser rolls.

The distinct tag/trace molecules can build-up on the fuser roll, i.e., when paper edges are accumulated on the fuser roll surface, such that the level of edge wear on the fuser rolls is a function of the build-up of the tag/trace molecules. The photo detector can be designed as a digital camera or a full-width array (FWA) sensor. The light source produces the light exclusively in the range of black light (e.g., ultraviolet light). The parameterized model contains a set of algorithms, which relates the RGB data in the digital image of the fuser roll surface to the level of fuser roll wear.

Furthermore, the optical measurement system can be utilized on iGen and referred as Registration Distribution System (RDS). The optical measurement system is also implemented in situ, i.e. in the print engines, and provides real time measurements in a cost effective manner. The measurement system can also provide higher resolution and resolve the detail in the transition region between worn and non-worn areas on the fuser roll surface. Such measurement system can additionally be utilized to provide a signal to the press operator that the fuser roll needs to be changed.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
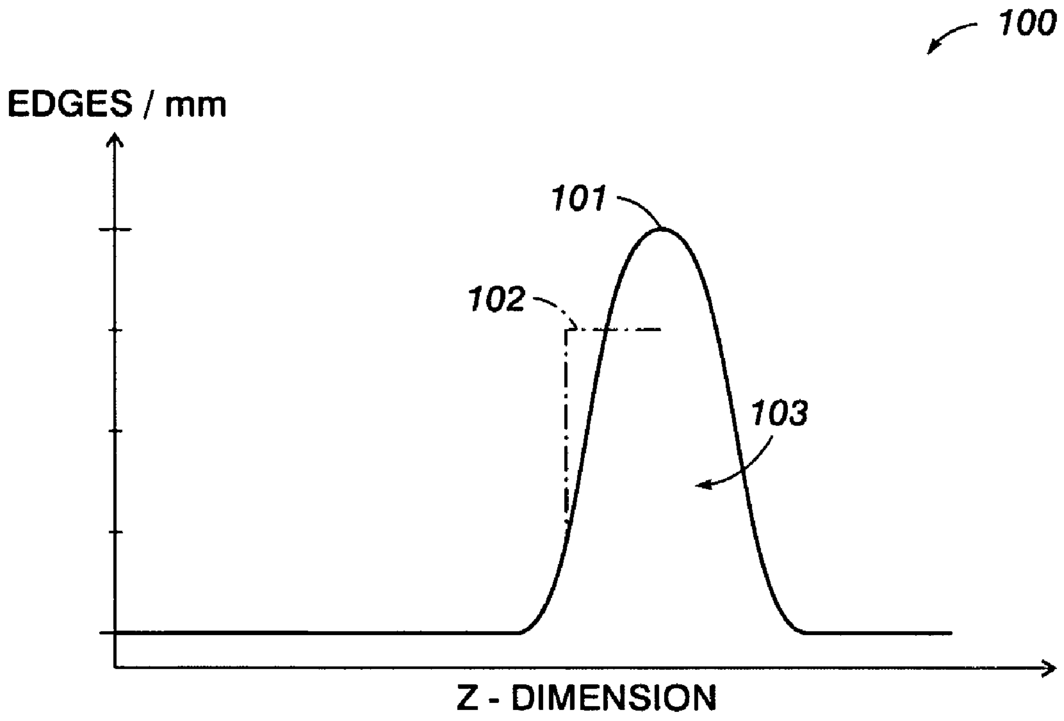
FIG. 1 PRIOR ART
FIG. 1 illustrates a Prior art schematic diagram of a graph of sheet edge density distribution over a fuser roll surface.
Figure 2:
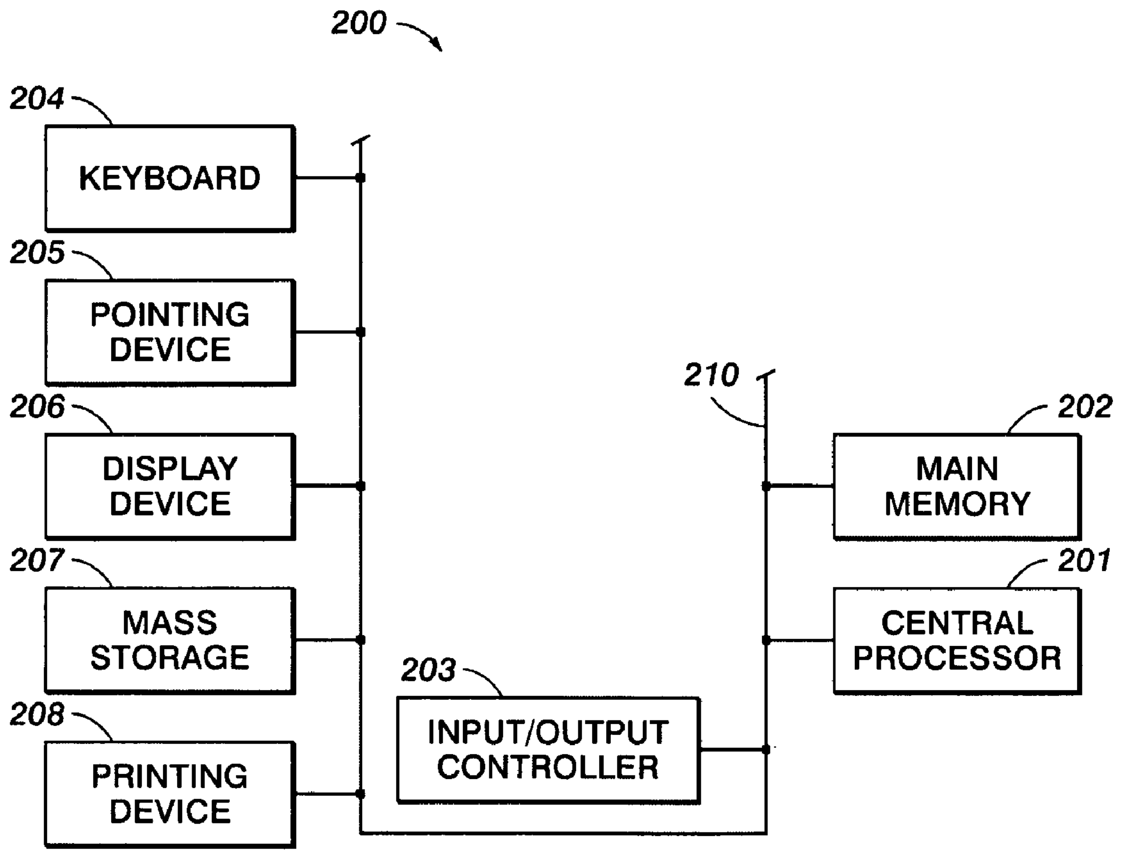
FIG. 2 illustrates a schematic view of a computer system in which the present invention may be embodied.

FIG. 2 is provided as exemplary diagrams of data processing environments in which embodiments of the present invention may be implemented. It should be appreciated that FIG. 2 is only exemplary and is not intended to assert or imply any limitation with regard to the environments in which aspects or embodiments of the present invention may be implemented. Many modifications to the depicted environments may be made without departing from the spirit and scope of the present invention.

Figure 3:
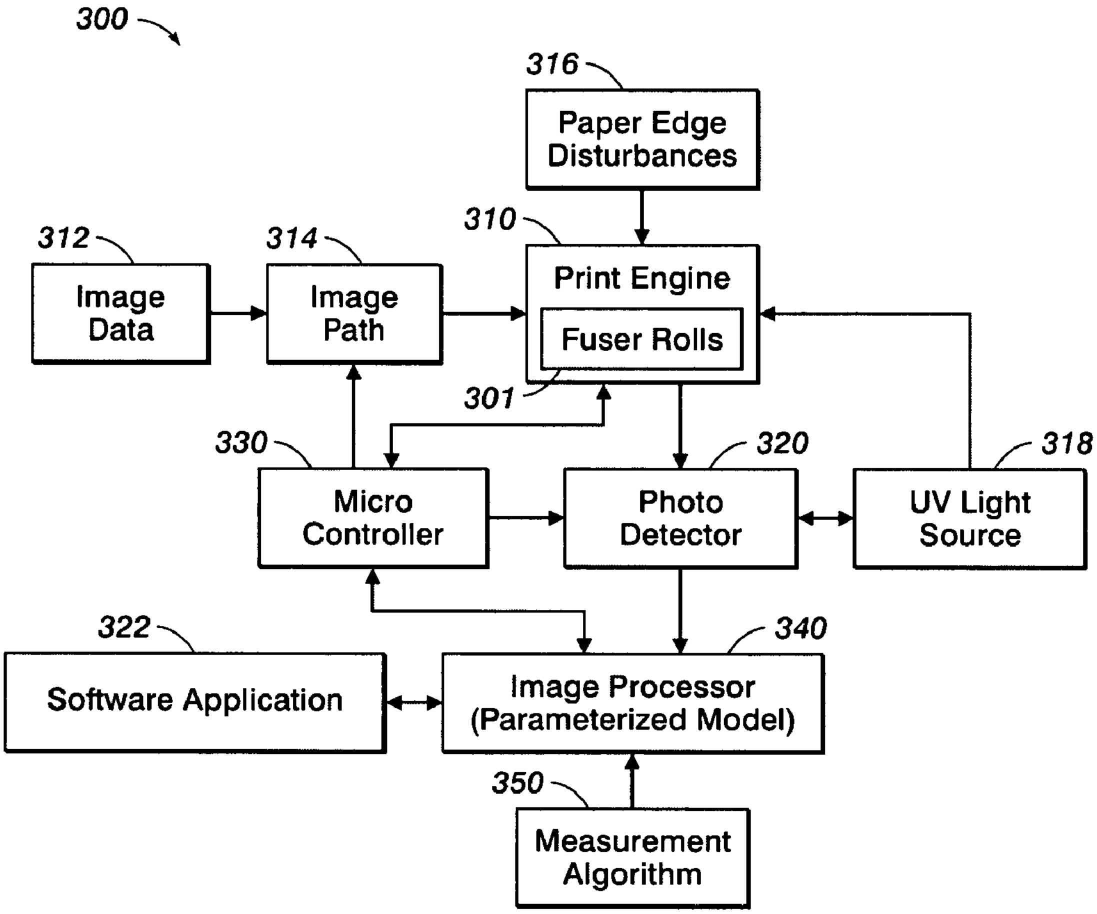
FIG. 3 illustrates a schematic diagram of an optical measurement system implemented in a print engine, which can be implemented in accordance with a preferred embodiment.

As depicted in FIG. 2, the present invention may be embodied in the context of a data-processing apparatus 200 comprising a central processor 201, a main memory 202, an input/output controller 203, a keyboard 204, a pointing device 205 (e.g., mouse, track ball, pen device, or the like), a display device 206, and a mass storage 207 (e.g., hard disk). The present invention mainly focuses on additional input/output devices, such as a printing device 108, may be included in the data-processing apparatus 200 as desired. The printing device 208 includes a print engine 310 as shown in FIG. 3, which can be implemented with an optical measurement system 300 in accordance with the embodiments of the present invention. As illustrated, the various components of the data-processing apparatus 200 communicate through a system bus 210 or similar architecture.

The following description is presented with respect to embodiments of the present invention, which can be embodied in the context of a data-processing apparatus 200 depicted in FIG. 2. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments which follows is for purposes of illustration and not considered a limitation.

Referring to FIG. 3 a schematic diagram of an optical measurement system 300 implemented in a print engine 310, which can be implemented in accordance with a preferred embodiment. The optical measurement system 300 can include customer image data 312, which is received through an input device (not shown). The image data can be manipulated through an image path 314, until a desired digital target image is outputted to a print engine 310 for printing of an output print. However, the output print contains one or more print defects due to paper edge disturbances 316 on fuser rolls 301 in the print engine 310. Therefore, it is important to detect the fuser roll wear due to the paper edge disturbances 316.

Figure 5:
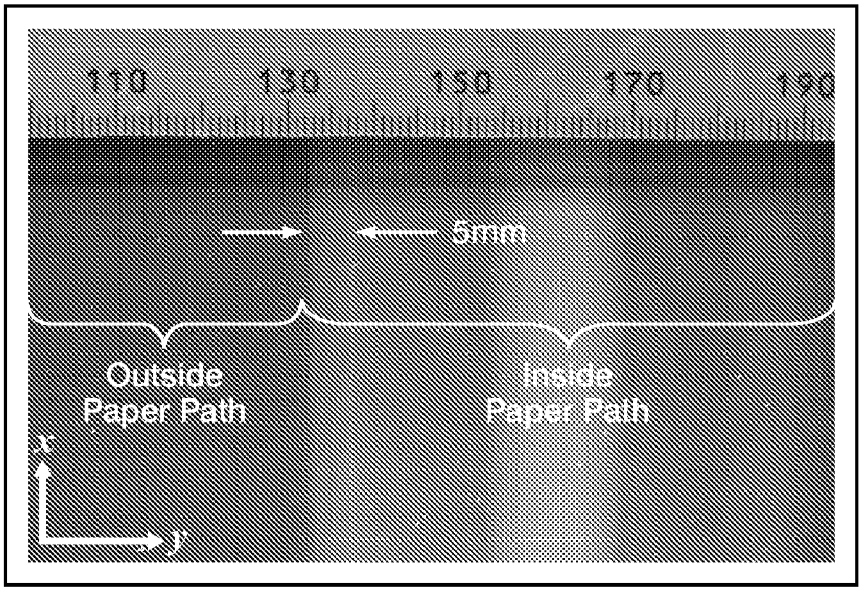
FIG. 5 illustrates an example picture of a fluorescence pattern on the fuser roll surface, which can be implemented in accordance with a preferred embodiment.

The optical measurement system 300 utilizes a UV light source 318, a photo detector 320, an image processor 340 and a measurement algorithm 350 for determining the fuser roll wear. The image path 314, the print engine 310, the photo detector 320 and the image processor 340 can be electrically controlled using a micro controller 330. The UV light source 318 emits light with intensity almost exclusively in the near ultraviolet range, i.e. black light, on the fuser roll 301. The papers can be treated with optical brighteners with fluorescent properties. A fluorescence pattern 500, as shown in FIG. 5, on the roll 301 can be changed according to the edge density distribution, when the paper edges accumulate on the fuser roll surface. The photo detector 320, e.g. digital camera or full-width array (FWA) sensor, can capture a two-dimensional, digital image of the fluorescence pattern 500 in the fuser roll surface after illuminating the fuser roll surface using the light source 318.

Furthermore, the digital images of the fuser roll surface can be fed to the image processor 340, which is designed as a parameterized model. The image processor 340 can analyze the digital image of the fuser roll surface in accordance with an in-built software application 322. The digital image of the fuser roll surface can be processed in Photoshop and analyzed in ImagePro with the help of measurement algorithm 350. The image processor 340 can quantify the changes in the fluorescence pattern on the fuser roll 301 based on the analysis of the digital image. Finally, the image processor 340 relates the RGB data in the digital image of the fluorescence pattern to the wear level of the fuser rolls 301 in the print engine 310. The micro controller 330 can adjust subsequent operation of the print engine 310 in a closed-loop fashion based on the metrics received from the image processor 340 in order to compensate the edge wear level of the fuser rolls 301.

Such an optical measurement system 300 can achieve high resolution and resolve the details in the transition region between the worn and non-worn areas on the fuser roll 301, since the transition region can be important for edge wear perceptibility. The system 300 can be implemented within the print engine 310, which avoids removal of the fuser rolls 301 from the machine for measuring the wear level. The system 300 provides a real-time feedback control due to the closed-loop RDS control, which tightly controls the shape of the edge density distribution.

The system 300 can compare the measured intensity profile on fuser roll surface to an optimal reference shape for the edge density distribution in order to adjust the RDS actuators for minimizing the error between the measured profile shape and the optimal reference shape. The system 300 can use a diagnostic property, which provides a signal to the press operator that the fuser roll 301 needs to be changed before the wear defects appear in the prints. The system 300 can also provide job planning/sheet scheduling, in which the job planner and/or sheet scheduler (not shown) can be alerted when particular wear thresholds are reached, so that the jobs/sheets can be routed to the appropriate fuser rolls 301 and/or the print engine 910. Such job planning/sheet scheduling can be utilized in either a TIPP or a two-stage fusing application.

Figure 4:
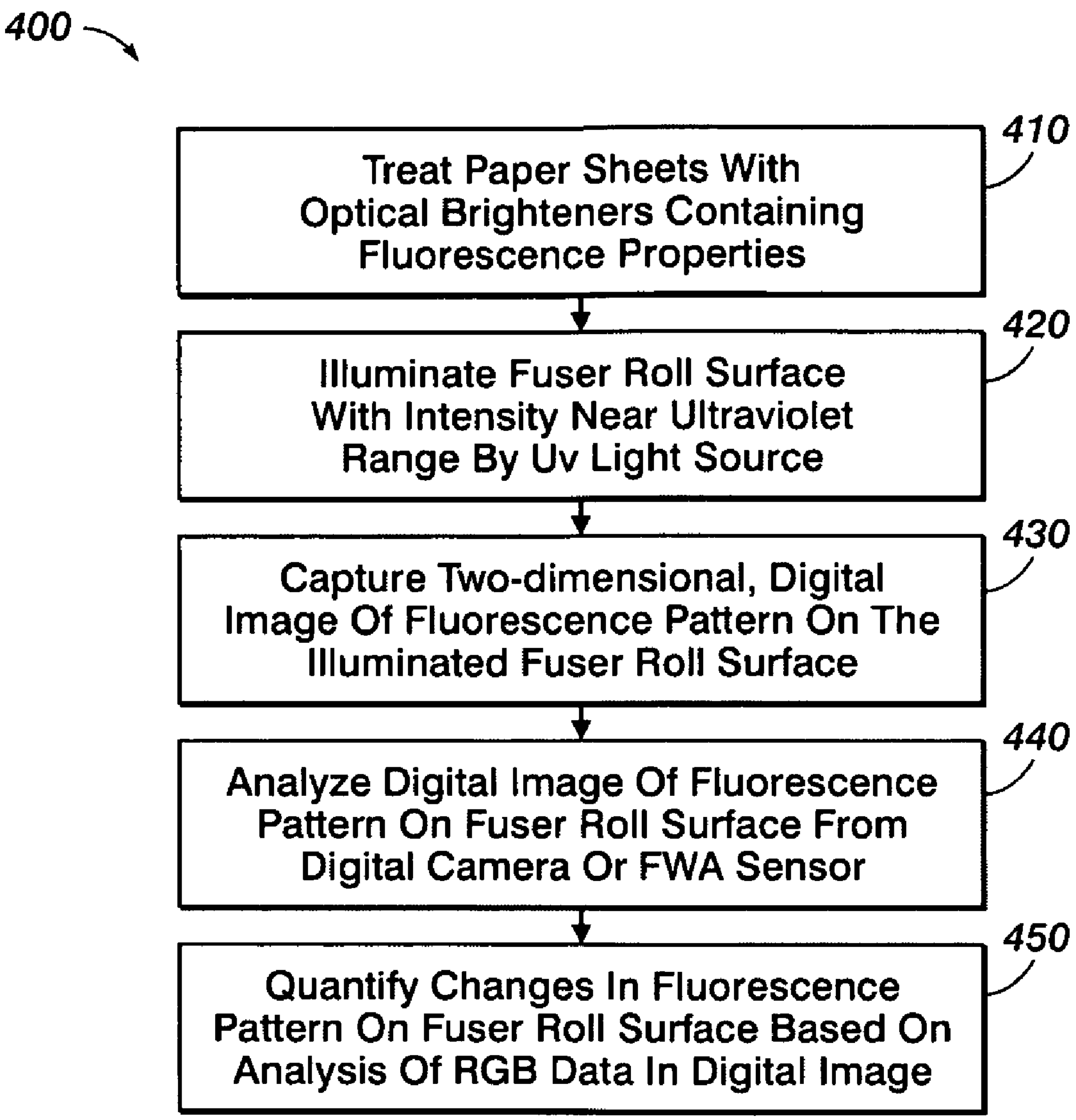
FIG. 4 illustrates a flowchart of a method for determining a wear level of the fuser roll, which can be implemented in accordance with an alternative embodiment.

Referring to FIG. 4 a flowchart of a method 400 for determining a wear level of the fuser roll 301, which can be implemented in accordance with an alternative embodiment. As illustrated at block 410, the paper sheets can be initially treated with optical brighteners containing fluorescent properties, which act as distinct tag/trace molecules. The tag/trace molecules can build-up on the fuser roll 301, in which the level of fuser roll wear can be detected. The tag/trace molecules can change the fluorescence pattern 500 on the fuser roll 301 in accordance with the edge density distribution in the print engine 310, when the paper edges are accumulated on the fuser roll surface. As depicted at block 420, the fuser roll surface can be illuminated with intensity near ultraviolet range by using the UV light source 318. Thereafter, as shown at block 430, a two-dimensional, digital image of the fluorescence pattern 500 on the illuminated fuser roll surface can be photographed under black light illumination using a digital SLR camera or FWA sensor 320. The resulting digital images are processed in Photoshop. As displayed at block 440, the digital image of the fluorescence pattern 500 on the fuser roll surface from the digital camera or FWA sensor 320 can be analyzed in ImagePro. Finally, as illustrated at block 450, changes in the fluorescence pattern 500 on the fuser roll surface can be quantified, using an image processor 340, based on the analysis of RGB data in the digital image in order to determine the edge wear level on the fuser roll 301 in the print engine 310. Such a method 400 can also be implemented in situ and provide real time measurements.

Figure 6:
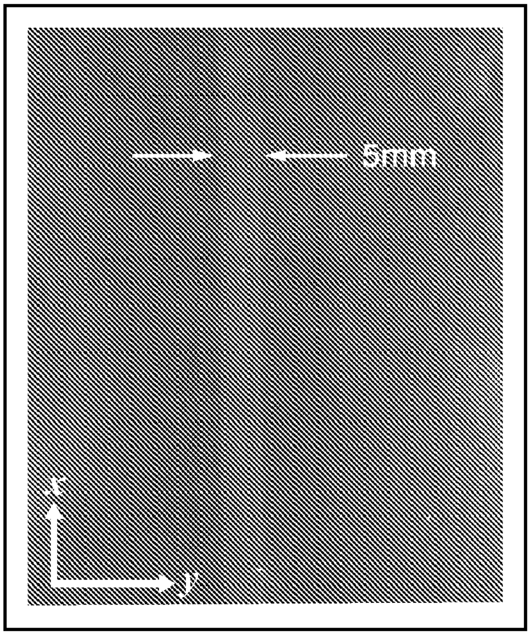
FIG. 6 illustrates an example picture of a black solid area print from a fuser roll as shown in FIG. 5, which can be implemented in accordance with a preferred embodiment.

Referring to FIG. 5-6 example pictures of a fluorescence pattern 500 on the fuser roll surface and a black solid area print 600 from a fuser roll 301 as shown in FIG. 5 are illustrated, which can be implemented in accordance with a preferred embodiment. Optical brighteners commonly used in the papers can fluoresce the fuser roll 301 with tag/trace molecules. The fluorescence pattern on the fuser roll surface can change in accordance with the edge density distribution when the paper edges accumulate on the fuser roll 301. The changes in the fluorescence pattern can be measured by analyzing the fuser roll picture of the fluorescence pattern 500.

For example, the six iGen fuser rolls 301 can be analyzed for edge wear based on baseline experiments, which are a part of an accelerated life test. In such baseline experiments, 25,000 paper sheets of 280 gsm Xerox Elite Gloss (8.5×11") can run as wear media, and RDS can be set to 5 mm, which refers to a travel distance of the fuser roll 301. In addition, an IQ set can be printed at every 5,000 prints, which includes full-page, solid area black prints 600 on 120 gsm Xerox Elite Gloss (14.33×20.5") for edge Δgloss measurements. Each of the six fuser rolls 301 can be photographed under black light illumination using the photo detector 320 as shown in FIG. 3, after completing the baseline experiments.

Digital images from the digital SLR camera 320 can be processed in Photoshop and analyzed in ImagePro. Edge Δgloss on the solid black prints 600 can be characterized using delta beta gloss per medge per mm metric used by iGen fusing process design. The digital pictures, as shown in FIGS. 5 and 6, represent the fluorescence pattern 500 and the solid area black prints 600 produced using the fuser roll 301 based on baseline experiments. The solid area black prints 600 can be produced by adjusting the angle between a light source 318 as shown in FIG. 3, and the image to accentuate the gloss streak. Each digital picture can readily and clearly illustrate 5 mm edge wear zone due to RDS.

Figure 7:
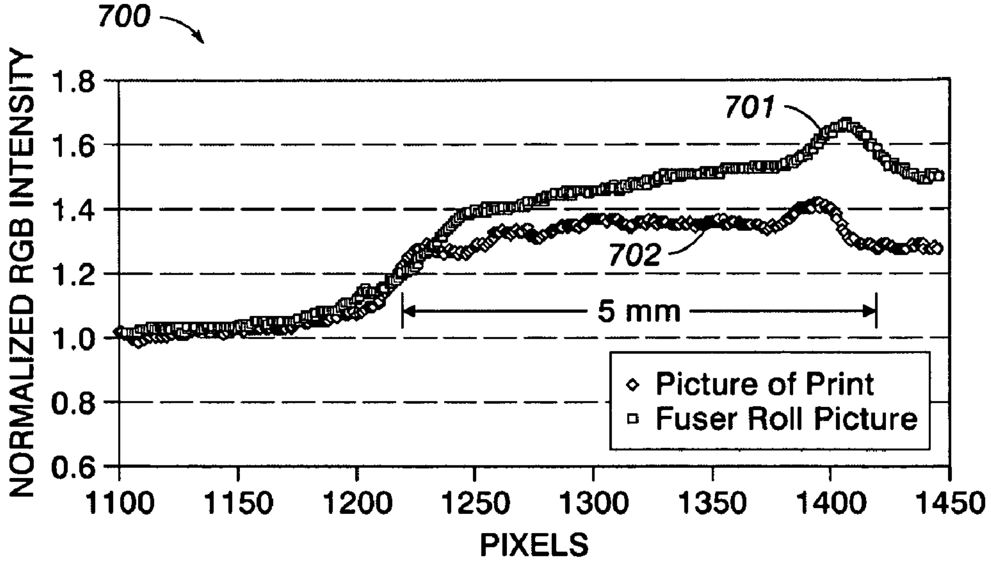
FIG. 7 illustrates a graph of comparison between a RGB profile from a fuser roll picture to a corresponding RGB profile from a print sample, which can be implemented in accordance with a preferred embodiment.

Referring to FIG. 7 a graph 700 of comparison between a RGB profile from a fuser roll picture 701 to a corresponding RGB profile from a print sample 702 is illustrated, which can be implemented in accordance with a preferred embodiment. The intensity profiles of the fuser roll picture 701 and the print picture 702 are taken from the digital images in FIGS. 5 and 6, and are plotted as a function of axial position y for a specific x location as shown in FIGS. 5 and 6. The two RGB profiles indicate that observation of the edge wear on the fuser roll 301 also appears on the print.

Figure 8:
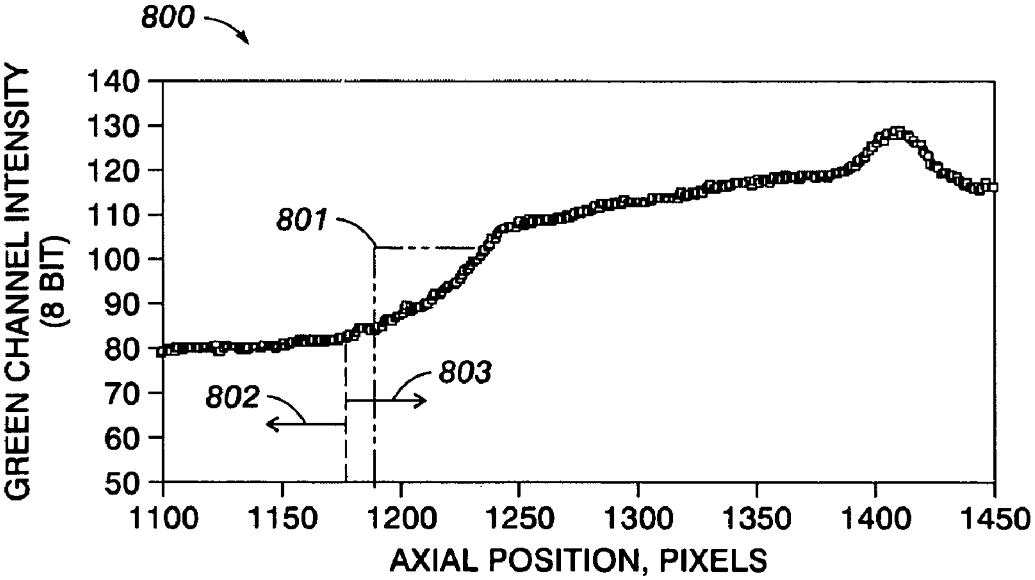
FIG. 8 illustrates a graph of a sample wear metric of the fuser roll surface, which can be implemented in accordance with an alternative embodiment.

In particular, a thin line (<1 mm), which appears at the right-hand side of an edge wear zone (EWZ) 803, as shown in FIG. 8, in the intensity profile of the fuser roll picture 701, is also apparent in the print. Additionally, the overall change in the intensity profile of the fuser roll picture 701 can be larger than the intensity change observed on the print. Therefore, the system 300 can detect or measure changes on the fuser roll 301 before the two RGB profiles apparent on the print. Such measurements from the fuser roll surface can be utilized to initiate control actions for adjusting the RDS system, or alert the customer to perform preventative maintenance over the print engine 310.

Referring to FIG. 8 a graph 800 of a sample wear metric of the fuser roll surface is illustrated, which can be implemented in accordance with an alternative embodiment. The measurements from the fuser roll surface can also be compared to standardized measurements of the gloss streaks on the solid area black prints 600. A slope 801 of the intensity profile in the fuser roll picture 701 near the boundary of the edge wear zone 803 can be considered for such fuser roll surface measurement. The slope 801 should not be taken in an outside paper path (OPP) 802. The slope 801 of the intensity profile in the fuser roll picture 701 can be quantified in accordance with the green channel intensity and the axial position of the fuser roll surface.

Figure 9:
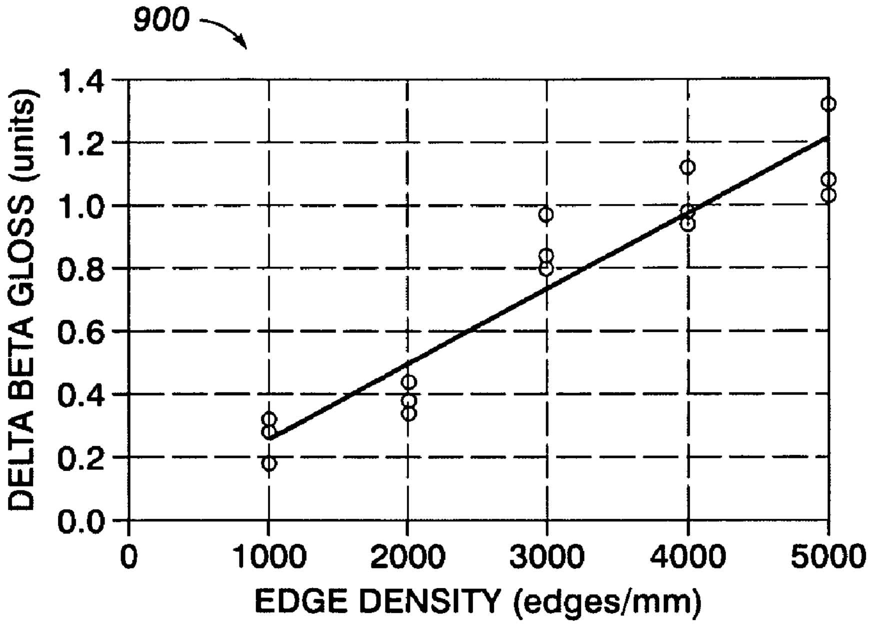
FIG. 9 illustrates an example chart of a standard ΔBeta gloss profile, which can be implemented in accordance with an alternative embodiment.

Referring to FIG. 9 an example chart of a standard Beta gloss profile 900, which can be implemented in accordance with an alternative embodiment. The "Beta gloss per Medge per mm" metric 900 can be considered for the standardized measurements of the gloss streaks on the solid area black prints 600. A Beta gloss meter can be utilized for calculation of the "Beta gloss per Medge per mm" metric 900 in order to compute the gloss difference between an area within the gloss streak and a neighboring area near the gloss streak. Then, the gloss difference can be computed for each IQ set. The edge density can be increased by 1,000 edges/mm for each IQ set, i.e. 5,000 edges/5 mm=1,000 edges/mm, since the IQ sets are printed at every 5,000 prints and the RDS can be set to 5 mm. For each fuser roll, the Beta gloss differences for each IQ sets are plotted as a function of the edge density. Then, the slope of the resulting line is the "ΔBeta gloss per Medge per mm" metric 900.

Figure 10:
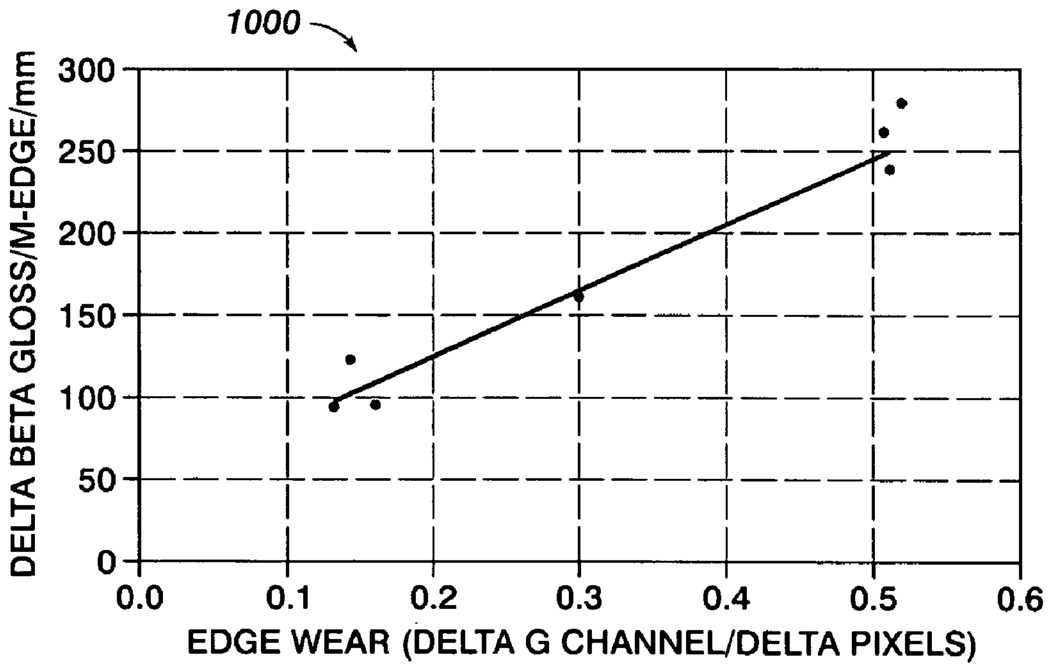
FIG. 10 illustrates a graph of correlation between fuser roll measurements and standardized measurements of gloss streaks on prints, which can be implemented in accordance with an alternative embodiment.

Referring to FIG. 10 a graph 1000 of correlation between the fuser roll measurements and the standardized measurements of the gloss streaks on the prints 600, which can be implemented in accordance with an alternative embodiment. The correlation can be done by plotting the "Beta gloss per Medge per mm" metric 900 with the edge wear slope 801, i.e. the sample wear metric of the fuser roll surface. The correlation between the fuser roll measurements and the standardized measurements can indicate that the fuser roll measurements relate the fluorescence pattern 500 to the edge wear and not as direct measure of the gloss streaks on the prints 600. Therefore, the fuser roll measurements can provide higher resolution and resolve the detail in the transition region between the worn and non-worn areas on the fuser roll surface.

It will be appreciated that variations of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. An optical measurement system for determining a wear level of one or more printer components, comprising:

at least one distinct tag/trace molecule applied on at least one paper sheet and adapted to be transferred to printer components during printer operation;

an ultraviolet light source for illuminating tag/trace molecules transferred from the at least one paper sheet to a printer component with an intensity near ultraviolet range, wherein said ultraviolet light source produces light exclusively in a range of black light;

a photo detector adapted for capturing a two-dimensional, digital image of at least one fluorescence pattern on the surface of said printer components under black light illumination; and an image processor with at least one parameterized model for measuring changes in said at least one fluorescence pattern on the surface of said printer component by analyzing said two-dimensional, digital image in order to determine a level of wear on said printer components.

2. The system of claim 1 wherein said at least one distinct tag/trace molecule is comprised of an optical brightener that includes fluorescent properties, wherein said optical brightener includes fluorescent properties, which act as one or more distinct tag/trace molecule.

3. The system of claim 1 wherein said at least one fluorescence pattern on said printer components is changed in accordance with an edge density distribution in said print engine.

4. The system of claim 1 including a micro controller adapted to adjust operation of said printer components in a closed-loop fashion based on metrics received from said image processor in order to compensate for the edge wear level of fuser rolls associated with said printer components.

5. The system of claim 1 including an optical measurement system adapted to achieve high resolution and resolve details in the transition region between the worn and non-worn areas on fuser rolls associated with said printer components, wherein resolution is implemented within a print engine associated with said printer components and wherein real-time feedback control tightly controls the shape of edge density distribution.

6. The system of claim 1 wherein said one or more distinct tag/trace molecule build-up on said printer component, when one or more edges of said plurality of paper sheets are accumulated on the surface of said printer component.

7. The system of claim 1 wherein said printer components include a fuser roll.

8. The system of claim 1 wherein said at least one parameterized model relates RGB data in said two-dimensional, digital image of said at least one fluorescence pattern to said level of edge wear on said printer component.

9. The system of claim 8 wherein said at least one fuser roll is analyzed from a baseline experiment.

10. The system of claim 9 wherein said optical measurement system is implemented in a print engine.

11. The system of claim 9 wherein said at least one fluorescence pattern on said at least one fuser roll is changed in accordance with an edge density distribution in said print engine.

12. The system of claim 9 wherein said at least one photo detector comprises a digital single-lens reflex (SLR) camera and a full width array (FWA) sensor.

13. The system of claim 9 wherein said one or more distinct tag/trace molecules build-up on said at least one fuser roll, when one or more edges of said plurality of paper sheets are accumulated on the surface of said at least one fuser roll.

14. The system of claim 9 wherein said at least one parameterized model relates RGB data in said two-dimensional, digital image of said at least one fluorescence pattern to said level of edge wear on said at least one fuser roll.

15. The system of claim 9 wherein said at least one tag/trace molecule includes an optical brigthener.

16. The system of claim 9 wherein said at least one fuser roll is analyzed from a baseline experiment.

17. The method of claim 16 further comprising the step of providing a micro controller adapted to adjust operation of printer components in a closed-loop process based on metrics received from said image processor to compensate for edge wear level of fuser rolls associated with said printer components.

18. The system of claim 16 wherein said at least one fluorescence pattern on said printer component is changed in accordance with an edge density distribution in a print engine associated with said optical measurement system.

19. The system of claim 16 wherein said tag/trace molecule includes an optical brightener.

20. The system of claim 1 wherein said micro controller and image processor are further adapted to achieve high resolution and resolve details in a transition region between worn and non-worn areas on fuser rolls associated with said printer components, and wherein resolution is implemented within a print engine associated with said printer components and wherein real-time feedback control tightly controls the shape of edge density distribution.

21. An optical measurement system for determining a wear level of at least one fuser roll used in a printing system, comprising:

at least one tag/trace molecule applied to a plurality of paper sheets, wherein said optical brightener includes fluorescent properties which act as one or more distinct tag/trace molecules;

an ultraviolet light source for illuminating at least one fuser roll with an intensity near ultraviolet range, wherein said ultraviolet light source produces light exclusively in a range of black light;

a photo detector adapted for capturing a two-dimensional, digital image of at least one fluorescence pattern on the surface of said at least one fuser roll under black light illumination; and an image processor with at least one parameterized model for measuring changes in said at least one fluorescence pattern on the surface of said at least one fuser roll by analyzing said two-dimensional, digital image in order to determine a level of edge wear on said at least one fuser roll.

22. A method of optical measurement for determining a wear level of one or more printer components, comprising:

applying a tag/trace molecule to at least one paper sheet, wherein said tag/trace molecule includes fluorescent properties adapted to act as at least one distinct tag/trace molecules;

providing an ultraviolet light source and illuminating a printer component previously in contact with said at least one paper sheet with ultraviolet light;

providing a photo detector adapted to capture a two-dimensional, digital image of at least one fluorescence pattern on the surface of said printer component with ultraviolet light; and providing an image processor with at least one parameterized model adapted for measuring changes at least one fluorescence pattern from the surface of said printer component by analyzing said two-dimensional, digital image in order to determine a level of edge wear on said printer component.

* * * * *